US008608607B2

(12) United States Patent
Kandeth

(10) Patent No.: US 8,608,607 B2
(45) Date of Patent: Dec. 17, 2013

(54) INFINITELY VARIABLE GEAR TRANSMISSION WITH AUTOMATIC GEAR COUPLING

(76) Inventor: Ukkru Varunny Kandeth, Trichur (IN)

(*) Notice: Subject to any disclaimer, the term of this patent is extended or adjusted under 35 U.S.C. 154(b) by 0 days.

(21) Appl. No.: 13/134,846

(22) Filed: Jun. 20, 2011

(65) Prior Publication Data
US 2011/0306455 A1  Dec. 15, 2011

(51) Int. Cl.
*F16H 47/08* (2006.01)
(52) U.S. Cl.
USPC .......................................................... 475/94
(58) Field of Classification Search
None
See application file for complete search history.

(56) References Cited

U.S. PATENT DOCUMENTS

| 2,973,669 | A  | * | 3/1961  | Quigley      | 477/51  |
| 3,645,152 | A  | * | 2/1972  | Olcer        | 475/102 |
| 5,102,376 | A  | * | 4/1992  | Batt         | 475/72  |
| 5,584,772 | A  | * | 12/1996 | Hayd         | 475/72  |
| 5,820,505 | A  | * | 10/1998 | Parker       | 475/72  |
| 6,634,976 | B1 | * | 10/2003 | Britt        | 475/91  |
| 7,354,368 | B2 | * | 4/2008  | Pollman      | 475/72  |
| 8,277,353 | B2 | * | 10/2012 | Hiraki et al.| 475/73  |

* cited by examiner

*Primary Examiner* — Dirk Wright

(57) ABSTRACT

An infinitely variable gear transmission system for vehicles includes a differential gear unit for input, a planetary gear unit, an automatic gear coupling, a hydraulic pump and a hydraulic motor, the hydraulic pump rotating with the first output shaft of the differential gear unit and one of the three gear elements of the planetary gear unit, the hydraulic motor rotating with one of the two remaining gear elements, the automatic gear coupling for coupling the two output shafts of the differential gear unit, and a Microprocessor unit to selectively control the fluid pressure in the hydraulic circuit by adjusting the flow control valve, and control the speed of the third gear element connected to the vehicle.

9 Claims, 3 Drawing Sheets

INFINITELY VARIABLE GEAR TRANSMISSION WITH AUTOMATIC GEAR COUPLING

This is an addition to my Indian application no: 1439/CHE/2004 for which patent has been granted as Patent no: 209664 on 5 Sep. 2007, and international application no. PCT/IN2005/000142 published on 26 Jan. 2006 for which U.S. Pat. No. 7,632,205 has been granted on 15 Dec. 2009.

TECHNICAL FIELD

The present invention is directed to an infinitely variable gear transmission system for a vehicle drive line, and more particularly, to a transmission system having a single stage planetary gear unit (epicyclic gear unit) coupled with a differential gear unit, an automatic gear coupling, and a Microprocessor control unit.

BACKGROUND OF THE INVENTION

Current transmission assembly for automatic transmission, a standard accessory in the modern vehicles, can provide normally 4 or 5 gear ratios between the prime mover and the driven wheels for building up the necessary torque while the vehicle moves from zero speed to the normal speed, and for over drive. The variable transmission systems currently in use, mostly rely upon conventional speed variators, such as steel chain with flexible pulley, toroidal drives, hydraulic torque convertors, electric generators etc. for transmitting the power, which primarily suffer from the delay for responding to load change, and also the limited capacity, and the inability to efficiently transmit the power, mainly due to the loss suffered by the conversion of mechanical power into pressure energy, electrical energy etc. There are also known "torque transfer systems" (Phelan) which can be used only for forward movement, in one configuration, and not for reverse and overdrive, which needs different configurations of gear elements. These systems can be used only for differential drives and produce excessive heat during normal operation wherein one of the hydraulic pumps will discharge against the other hydraulic pump, keeping both the pumps in a locked position having no torque differentiation. Additionally, these transmission systems are expensive and suffer from operational inefficiency such as delay for automatically correcting the torque level for different driving conditions, resulting in excessive fuel consumption, poor acceleration, dirty emission and high rate of wear.

The automatic transmission system for which an Indian patent and a U S patent has been granted to me, as mentioned earlier, eliminates the above deficiencies to a considerable extend. However the technology followed in this system for maintaining the speed of the planet carrier and sun gear at the same level during normal drive, by directing the fluid discharge from the right side hydraulic pump rotating with the sun gear, to the suction side of the left side hydraulic pump rotating with the planet carrier, can cause excessive heat during continuous operation and can waste pressure energy to certain extent. The fluid under pressure, discharged from these pumps to the fluid tank also wastes certain amount of pressure energy.

SUMMARY OF INVENTION

This invention discloses a transmission assembly which provides for any gear ratio right from zero to infinity, including the step up ratio for over drive, with an additional provision for higher ratio for building up higher torque for heavy load condition, all in one configuration, resulting in better fuel efficiency, and better acceleration, at the same time reducing the use of hydraulic pumps to a large extent, and thus reducing the amount of heat generated and wastage of pressure energy as well. This was made possible in this system by incorporating an automatic gear coupling controlled by the microprocessor, which will connect the sun gear with planet carrier and thus maintaining the speed of sun gear, planet carrier and the ring gear at exactly the same level, during normal drive, instead of directing the fluid discharge from right side (sun gear) pump to the input side of the left side (planet carrier) pump as in the previous invention. Also the fluid discharge from the right side hydraulic pump, instead of directing into the fluid tank, is diverted into a conventional hydraulic motor installed on the planet carrier shaft, to provide additional torque for the planet carrier. The hydraulic motor can also be installed on the ring gear shaft, instead of the planet carrier shaft, to provide additional torque for the ring gear. There is a bypass valve in the fluid line controlled by the microprocessor, which will divert the fluid discharge from the hydraulic pump into the fluid tank through the fluid return line, during neutral, normal, and reverse drive, wherein there is no need for the hydraulic motor to function.

If necessary, the hydraulic motor can also be utilised for driving the super charger, compressor, generator etc. if installed separately outside.

The present invention also provides a hand brake attached to the second output shaft of the differential unit replacing the left side hydraulic pump. By manually operating the hand brake, the speed of the second output shaft connected to the planet carrier can be brought down so that the direction of the rotation of the ring gear will change and the vehicle will move in reverse direction.

In view of the above, the present invention is directed to an infinitely variable gear transmission system including a differential gear unit for input, and a planetary gear unit with one hydraulic pump. In the preferred embodiment the hydraulic circuit having a flow control valve with variable orifice intercouples the hydraulic pump, rotating with the first output shaft of the differential gear unit and one of the three gear elements of the planetary gear unit, and the second output shaft rotating with a hydraulic motor and the second gear element, an automatic gear coupling for coupling the output shafts, and includes a Microprocessor control unit to control the speed of the third gear element.

Further scope of applicability of the present invention will become apparent from the following detailed description, claims, and drawings. However, it should be understood that the detailed description and specific examples, while indicating preferred embodiments of the invention, are given by way of illustration only, since various changes and modifications with in the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

In sheet no. 1.

In sheet no. 2.

In sheet No. 3.

DETAILED DESCRIPTION OF THE PREFERRED EMBODIMENT

Figure 1:
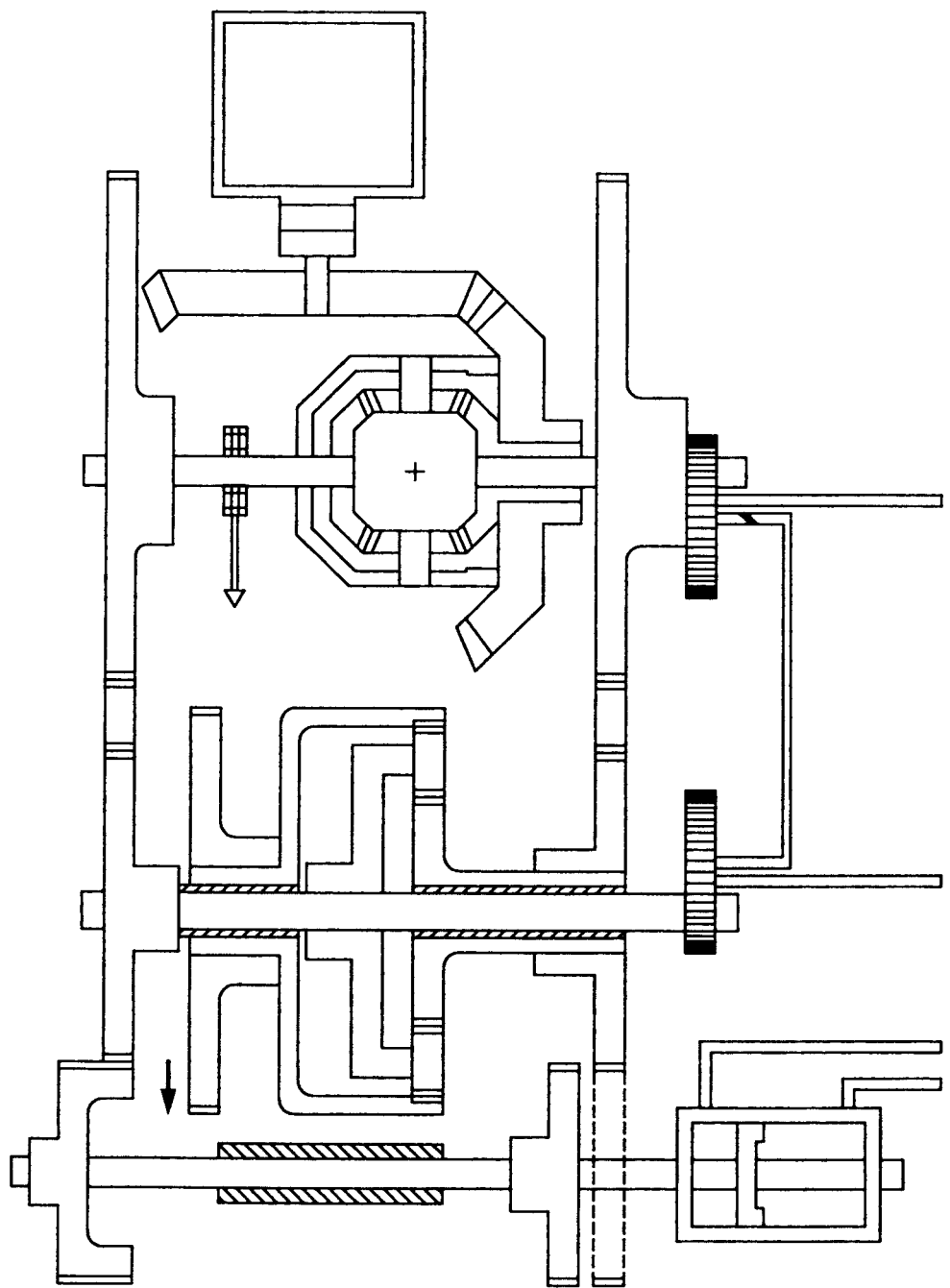
FIG. 1 is the general assembly of the equipment, in accordance with this invention, with the differential gear unit and the vehicle engine at the right end, the planetary gear unit at the left end, and the automatic gear coupling with the hydraulic cylinder at the extreme left end.
Figure 2:
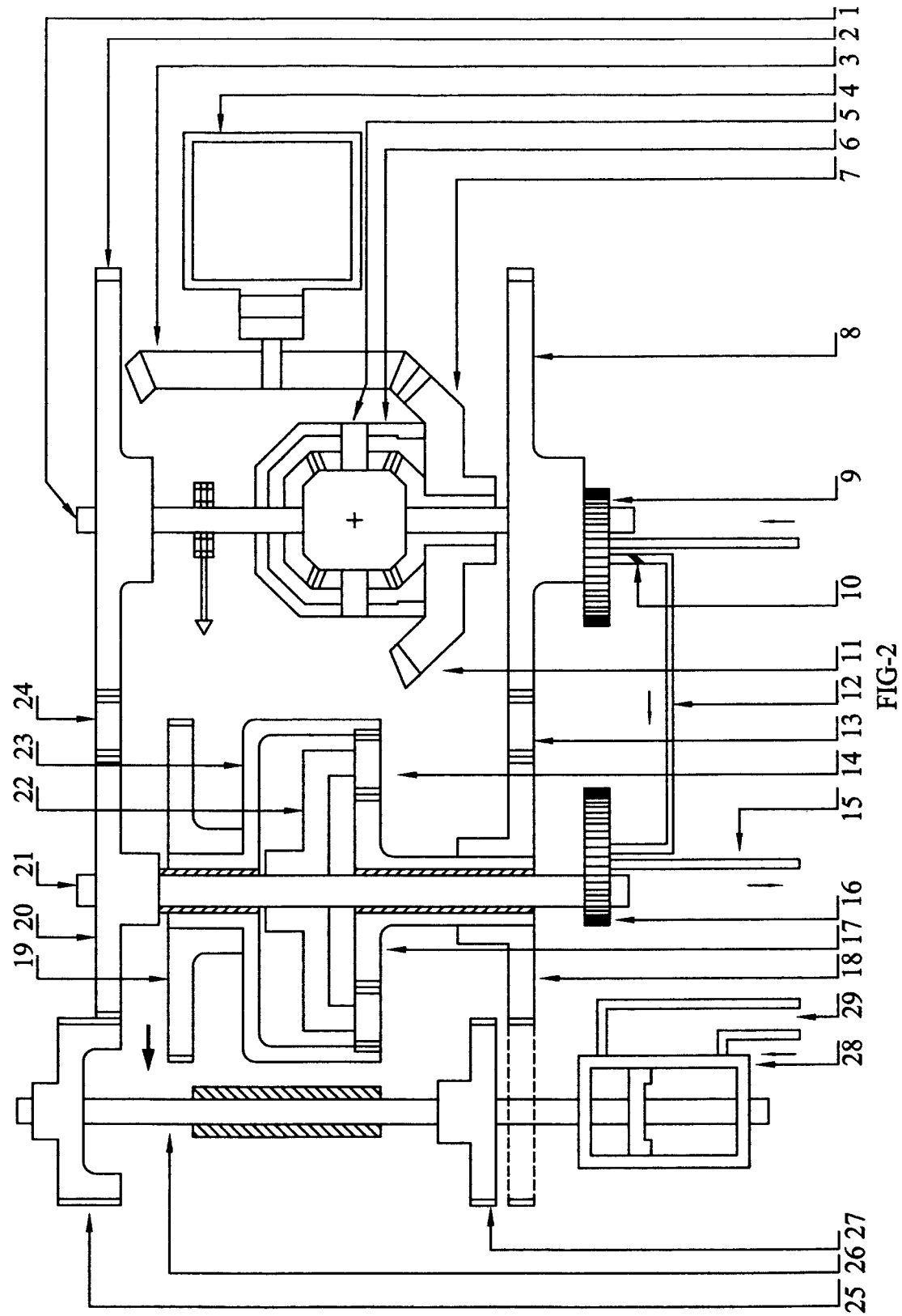
FIG. 2 is the sectional view of the differential gear unit with the vehicle engine connected to the input of the differential unit, the planetary gear unit connected to the differential, the gear coupling for connecting the sun gear and planet carrier, the hydraulic pump connected to the first output shaft of the differential unit, the hydraulic motor connected to the planet carrier shaft, and the fluid lines connecting the hydraulic pump, hydraulic motor and the fluid tank.

The details of the differential gear unit, as shown in FIG. 2, includes the second output shaft 1 with hand brake, the second output gear 2 for connecting to the planet carrier of the planetary gear unit, the input bevel gear 3, the vehicle engine 4 connected to the power input of the differential unit, the revolving pinion 5, differential body 6 containing the revolving and rotating pinions, the output bevel gear 7, the first output gear 8 for connecting to the sun gear of the planetary unit, the hydraulic pump 9 attached to the first output shaft of the differential unit, the flow control valve with variable orifice 10, the output bevel gear 11, the fluid line 12, the intermediate connecting gear 13 for coupling the first output gear to the sun gear, the planet 14, the fluid discharge line 15, the hydraulic motor 16, the sun gear 17, the connecting gear 18 attached to the sun gear, the connecting gear 19 attached to the ring gear, the connecting gear 20 attached to the planet carrier shaft, the planet carrier shaft 21, the planet carrier 22, the ring gear 23, and the intermediate gear 24 for coupling the second output gear and planet carrier shaft, the coupling gears 25 and 27 installed on the coupling shaft 26 for coupling the sun gear to the planet carrier, the hydraulic unit 28 for actuating the coupling shaft, the fluid inlet and outlet lines 29 of the hydraulic unit.

Figure 3:
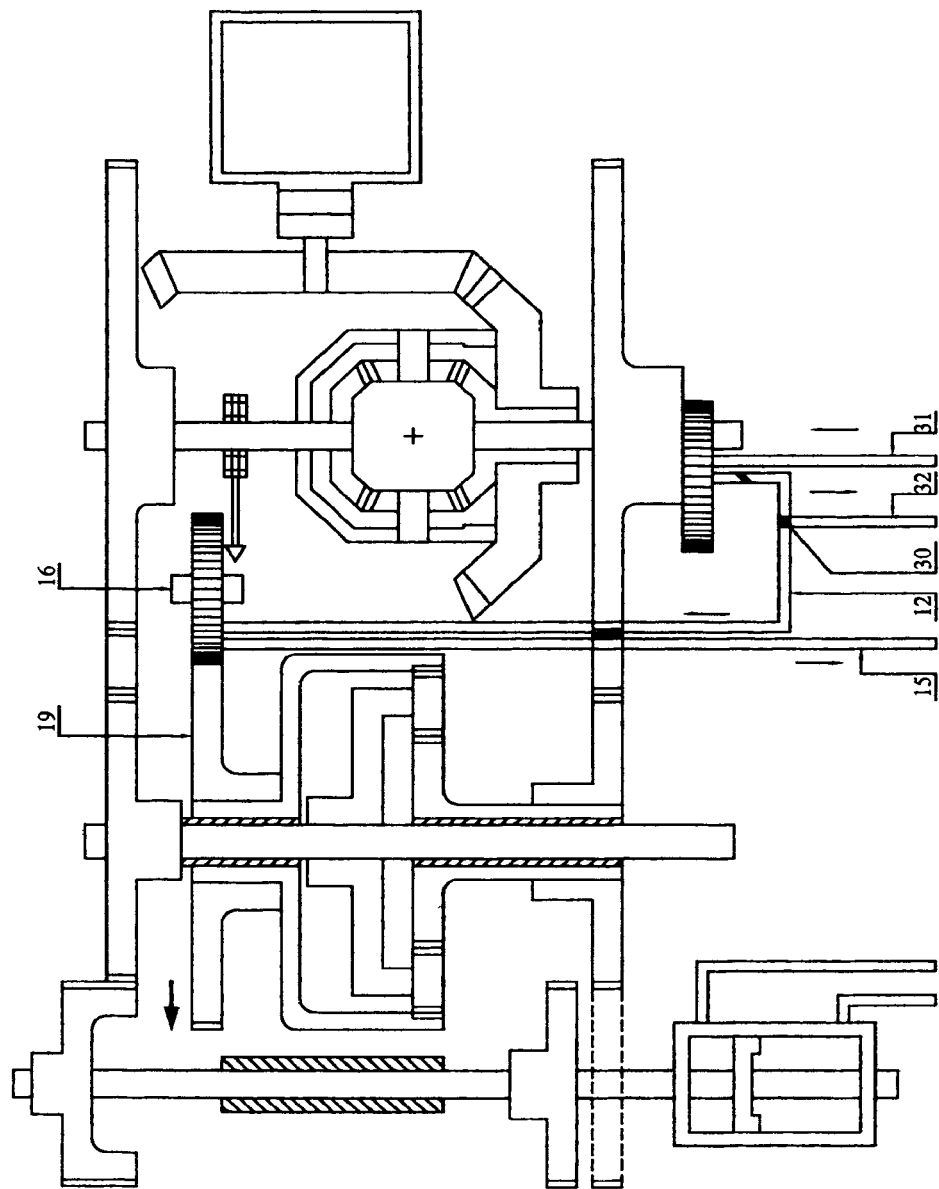
FIG. 3, is the sectional view of the planetary gear unit with the hydraulic motor connected to the ring gear through the connecting gear, the bye pass valve and also the fluid bypass line.

The details of the planetary gear unit, as shown in FIG. 3, includes the hydraulic pump 16 connected to the ring gear through the connecting gear 19, the fluid line 12, the fluid discharge line 15, the bypass valve 30, the fluid delivery line 31, and the fluid bypass line 32.

When the power from the vehicle engine is transmitted to the differential unit through the bevel gear pair, the output shafts of the unit start rotating. The rotation of the output shafts follows the formula $2N=N1+N2$ --- Formula (1) where as N is the engine speed in rpm. (hereafter referred to as speed). N1 is the first output shaft speed and N2 is the second output shaft speed.

While the vehicle control lever is in the park position the hydraulic pump installed on the first output shaft sucks the fluid from the fluid tank and freely pumps the fluid back into the tank through the flow control valve and the bypass valve. Therefore the output shafts are free to rotate at any speed.

In the case of planetary gear if X1 is the speed of the sun gear, X2 is the speed of planet carrier and X is the speed of ring gear (annulus) $X1=4.5X2-3.5X$ - - - Formula (2). (The annulus is connected to the vehicle through the output gear) whereas $(Z1+Z2)/Z1=4.5$ and $Z2/Z1=3.5$; Z1=No. of teeth on sun gear=24 and Z2=No. of teeth on annulus=84. Since the first output is connected to the sun gear, and the second output shaft is connected to the planet carrier N1=X1, and N2=X2.

If the engine speed is 1500 rpm, on applying formula (1) X1 will be equal to 2455 and X2 will be equal to 545. Similarly if the engine speed is 2000 rpm, X1 will be equal to 3273 and X2 will be equal to 727. If the engine speed is 3000 rpm, X1 will be 4909 and X2 will be 1091. In all these cases applying the value of X1 and X2 in formula (2), the output speed of the planetary gear unit, i.e. the value of X will be zero; Normally in the neutral position the engine speed will be maintained at 1,500 RPM and the speed of the hydraulic pump connected to the sun gear will be at 2,455 RPM.

When the vehicle is accelerated the microprocessor control will come into action, and automatically adjust the variable orifice of the flow control valve, to build up the fluid pressure to constantly maintain the sun gear speed at 2,454 RPM till the engine speed reaches 2,454 RPM for the direct drive, other wise known as normal drive, the gear ratio being 1:1. It may be noted from the formula - - - (2) that the tendency of the sun gear will be always to move faster and the planet carrier to move slower in order to slow down the ring gear connected to the vehicle. When the engine is accelerated, the sun gear speed will be always at 2,454; But the planet carrier speed will gradually increase with respect to Formula - - - (1). The resultant speed of the vehicle also will keep on increasing according to Formula - - - (2).

The output speed of the vehicle, corresponding to 1500 to 2454 rpm (engine speed) has been given below in Table-I.
Example: When engine speed is 2000 rpm, the R.S. output shaft speed is 2454 rpm.

$2N=N1+N2$           Applying formula (1)

$2\times2000=2454+N2$
Therefore N2=1546

$X1=4.5X2-3.5X$           Applying formula (2)

X1=N1 & X2=N2
Therefore $2454=4.5\times1546-3.5X$ and X=1286=The vehicle speed.

TABLE I

| | [RPM] | | |
| --- | --- | --- | --- |
| Engine speed N | First output shaft speed X1 | Second output shaft speed X2 | Ring gear speed X (vehicle speed) |
| 1500 | 2454 | 546 | 0 |
| 1525 | 2454 | 596 | 65 |
| 1600 | 2454 | 746 | 258 |
| 1700 | 2454 | 946 | 515 |
| 1800 | 2454 | 1146 | 772 |
| 1900 | 2454 | 1346 | 1029 |
| 2000 | 2454 | 1546 | 1286 |
| 2454 | 2454 | 2454 | 2454 |

The output speed is ranging from 0 to 2454, to provide enough starting torque for the vehicle during the gear drive.

At 2454 rpm the microprocessor will actuate the hydraulic unit of the automatic gear coupler, and connect the sun gear to the planet carrier. The coupler shaft will be axially moving so that the freely running coupling gear, will be engaged with the connecting gear coupled to the sun gear. The coupling gear at the other end of the shaft is already engaged with the planet carrier through the connecting gear attached to the planet carrier shaft. As seen from the Table (1) the engine, the sun gear, the planet carrier and the ring gear will now be running at the same speed for the normal drive as noted below. $X1=4.5X2-3.5X$. Since $X1=X2$, $X1=4.5 X1-3.5X$, Therefore $X=X1$; At the speed of 5250, the first and second output shafts, and also the planetary gear output will be at 5250. In this condition the vehicle is in direct drive.

If over drive is preferred at 5250 rpm (engine speed), the microprocessor will again come into action by operating a manual switch, and automatically disconnect the gear coupling, and adjust the variable orifice of the flow control valve to control the fluid pressure to constantly maintain the sun gear speed at 5,250 RPM, till the engine speed reaches 6,000 RPM and the ring gear speed 7,178 RPM. The speed of the sun gear, the planet carrier, the ring gear and the engine speed has been given below.
Please see (Table-II)

TABLE II

| | [RPM] | | |
|---|---|---|---|
| Engine speed N | First output shaft speed X1 | Second output shaft speed X2 | Ring gear speed X |
| 5250 | 5250 | 5250 | 5250 |
| 5400 | 5250 | 5550 | 5635 |
| 5500 | 5250 | 5750 | 5892 |
| 5750 | 5250 | 6250 | 6536 |
| 5900 | 5250 | 6550 | 6921 |
| 6000 | 5250 | 6750 | 7178 |

As Example:

$$2N = N1 + N2 \qquad (1)$$

$2 \times 6000 = 5250 + N2$
Therefore $N2 = 6750$
$N1 = X1$ & $N2 = X2$ $$X1 = 4.5X2 - 3.5X \qquad (2)$$

$5250 = 4.5 \times 6750 - 3.5X$
Therefore $X = 7178$ In this condition the vehicle is in over drive.

On return the vehicle speed will follow the same path till 5250 engine speed. At 5,250 RPM the microprocessor will again come into action and actuate the gear coupling to connect sun gear with planet carrier so that the vehicle will move in direct drive. At 2,454 speed, the microprocessor will actuate the gear coupler and disconnect the sun gear from the planet carrier. The vehicle will then move in the gear drive as in table (1) given earlier. Here also there is an option to postpone the operation of the automatic gear coupler by operating a manual switch, so that the sun gear and the ring gear will remain coupled through, and thus the vehicle can continue to operate in direct drive in slow speed, to save fuel.

For the reverse drive the vehicle will be first brought to the neutral position. The engine speed will be raised to 2,000 RPM. Therefore the speed of X1 will be 3,273 RPM and X2 will be 727 RPM. By operating the hand brake fixed on the second output shaft, the speed of the second output shaft of the differential gear unit connected to the planet carrier can be reduced to approximately 500 RPM. Automatically the sun gear speed will be increased to 3,500 RPM. From the formula (2) $4.5 \times 2 - X1 = 3.5X$ Wherein $X1 = 3,500$ and $X2 = 500$ Therefore X will be equal to $-357$. The vehicle will now move in reverse and the gear ratio will be $2000/357 = 5.6$ In case higher starting torque is required, the engine speed has to be raised and the sun gear speed has to be maintained at a higher rate by adjusting the flow control valve as shown in the example given in Table-III below.
This drive is basically meant for high ranges. As example the engine speed is raised to 3,208 RPM and the sun gear speed is set at 5,250 RPM by the microprocessor. The gear ratio at 3,250 engine speed will be $3,250/107 = 30.37$. This can provide very high starting torque.
At 4000 engine speed $$2N = N1 + N2 \qquad \text{Applying formula (1)}$$

Therefore $2 \times 4000 = 5250 + N2$
Therefore $N2 = 2750$ $$X1 = 4.5X2 - 3.5X \qquad \text{Applying formula (2)}$$

$N1 = X1$ & $N2 = X2$
Therefore $5250 = 4.5 \times 2750 - 3.5X$
Therefore $X = 2035$

TABLE III

| | [RPM] | | |
|---|---|---|---|
| Engine speed N | First output shaft speed X1 | Second output shaft speed X2 | Ring gear speed X |
| 3208 | 5250 | 1166 | 0 |
| 3250 | 5250 | 1250 | 107 |
| 3500 | 5250 | 1750 | 750 |
| 4000 | 5250 | 2750 | 2035 |
| 4500 | 5250 | 3750 | 3321 |
| 5000 | 5250 | 4750 | 4607 |
| 5250 | 5250 | 5250 | 5250 |

When the vehicle is in the neutral position and if the sun gear speed has been already set by the microprocessor at 2,454 RPM, the sun gear speed X1 can not increase. Therefore the vehicle can not move backward even when the vehicle is kept idling in the neutral position, on an upward inclination. This can avoid a few accidents caused by the vehicles moving backward and hitting the vehicle behind at the traffic points. Please see the formula - - - (2) $4.5X2 - X1 = 3.5X$ The vehicle can move backwards only if the value of X1 increases.

The hand brake installed on the second output shaft, if actuated quickly, can stop the vehicle faster in the event of an emergency.

During the entire operation the microprocessor will continuously receive the data on the throttle position, the lubrication oil temperature and the engine speed through sensors. If the engine speed matches with the throttle position, and the temperature is steady, the indication is that the engine produces enough torque required for the traction. At the moment there is an adverse change in any of the conditions, the microprocessor will immediately adjust the throttle position and bring down the engine speed to build up better torque. Similarly at any time during the gear drive, the driver can choose any gear ratio of his choice by manually operating the flow control valve.

The idle speed range and the speed limit settings of the differential gear output shafts can be selected depending on the type of vehicle and the users preference. The entire drive transmission can be controlled by a 32 bit 40 MHz microprocessor.

The foregoing discussion discloses and describes the exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:
1. An infinitely variable gear transmission system comprising: a differential gear unit coupled to a power input from a vehicle; a hydraulic pump, a single stage planetary gear unit drivably intercoupling a sun gear with a first output shall of said differential gear unit, and a planet carrier, a hydraulic motor, with a second output shaft, said planetary gear unit including the sun gear, a ring gear, the planet carrier, and at least one planet gear mounted on said planet carrier to rotate with and relative to said planet carrier and meshed with the sun gear and the ring gear, wherein a hydraulic circuit com- prising a bypass valve, a flow control valve with a variable orifice, hydraulically intercoupling the hydraulic pump coupled to the first output shaft of said differential gear unit, an automatic gear coupling for the first and second output shafts, a hand brake for the second output shaft for reversing the ring gear, and a microprocessor unit selectively controlling the resistance exerted by the fluid pressure on the said sun gear to control the speed of the ring gear of said planetary gear unit coupled to a drive shaft of the vehicle, to provide the desired speed for the vehicle.

2. The infinitely variable gear transmission system of claim 1 wherein said hydraulic circuit includes a hydraulic motor coupled to the planet carrier shaft, hydraulically intercoupling the hydraulic pump and said flow control valve with the variable orifice, to accelerate the ring gear connected to the vehicle.

3. The infinitely variable gear transmission of claim 1 comprises an automatic gear coupling to be actuated by said microprocessor to couple the sun gear and the planet carrier in order to maintain the speed of the sun gear, the planet carrier, and the ring gear at the same level during normal drive.

4. The infinitely variable gear transmission of claim 1 includes a manually operated hand brake coupled to the second output shaft of the differential gear unit to reduce the speed of the planet carrier in order to reverse the direction of rotation of the ring gear, and thus to provide reverse movement for the vehicle, and also to stop the vehicle quickly on an emergency.

5. The infinitely variable gear transmission system of claim 1, where in said microprocessor control unit continuously monitors accelerator pedal position of the vehicle, engine speed of the vehicle, and the lubrication oil temperature of the vehicle, to reduce the speed of said vehicle in case of overloading.

6. The infinitely variable gear transmission system of claim 1, where in said microprocessor control system sets the speed of the sun gear at constant level when the vehicle is idling in neutral and thus prevent the accidental movement of the vehicle in the reverse direction.

7. The infinitely variable gear transmission system of claim 1, where in said microprocessor control system sets the functional speed of the sun gear at a higher level as desired by the microprocessor control unit to reduce the speed of ring gear to build up additional torque while the vehicle moves up on a gradient.

8. The automatic gear coupling of claim 3 includes a manual switch which can withhold the action of said automatic gear coupling, and retain the sun gear and the ring gear coupled through, to enable the vehicle to continue in the normal drive with out moving to the gear drive, to save fuel.

9. The infinitely variable gear transmission system of claim 1 wherein said hydraulic circuit includes a hydraulic motor coupled to the ring gear instead of the planet carrier, hydraulically intercoupling the hydraulic pump and said flow control valve with the variable orifice, to accelerate the ring gear connected to the vehicle.

* * * * *